TAPE-RETAINING DEVICE FOR REELS

Filed Dec. 29, 1966

INVENTOR:
YATES M. HOAG,
BY William S. Wolfe
HIS ATTORNEY.

United States Patent Office 3,387,800
Patented June 11, 1968

3,387,800

TAPE-RETAINING DEVICE FOR REELS

Yates Maxwell Hoag, Utica, N.Y., assignor to General Electric Company, a corporation of New York Filed Dec. 29, 1966, Ser. No. 605,772
3 Claims. (Cl. 242—74.2)

ABSTRACT OF THE DISCLOSURE

A tape reel including a compressed spring device positioned in a recess in the reel hub. An end of a tape roll enters the recess through a slot in the hub rim and is secured to the hub by the spring device which pinches it against a wall of the recess.

*Summary of invention*

It is an object of this invention to provide a novel and inexpensive device for releasably securing recording tape to a reel hub.

In accordance with my invention in one form thereof, I provide a tape reel formed from a pair of spaced discs extending outwardly from a central hub. The hub is bounded by a cylindrical rim having a transverse slot therein which opens into a tape-receiving recess within the hub. A spring device including a pair of spring fingers is received under compression into the tape-receiving recess so that the fingers exert an outward force against the recess walls and to thereby secure an end portion of a magnetic recording tape roll inserted through the rim slot and positioned between the spring device and the recess wall.

*Description of drawings*

The invention may better be understood by the following detailed description taken in conjunction with the accompanying drawing in which.

*Detailed description*

Figure 1:
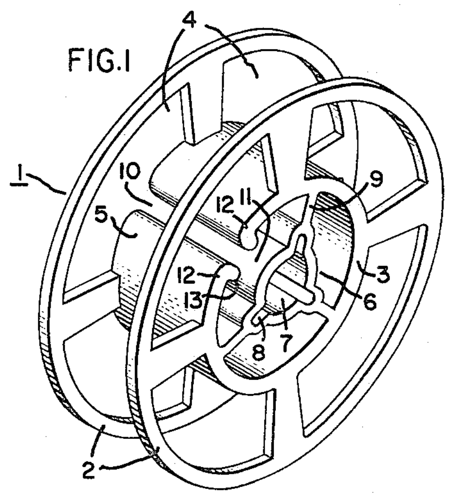
FIGURE 1 is a perspective view of the tape reel of the present invention with the spring device removed.

Referring now to FIGURE 1 of the drawings which illustrates the tape reel 1 of the present invention, a pair of spaced discs 2 are provided which extend outwardly from the central hub shown generally at 3. The discs 2 are spaced by a slightly greater distance than the width of a suitable tape roll to be wound around the hub 3. Each of the spaced discs may include a series of openings 4 extending to the rim 5 of the hub 3 to provide direct access to that part of the hub 3 from either side of the tape reel 1. The reel 1 may be preferably formed as a one-piece plastic molding, or as a two-piece molding wherein each piece would comprise one disc 2 and a portion of the hub 3. The hub 3 consists of a cylindrical rim 5 and a portion 6 depending inwardly from the rim for forming a central spindle hole 7 and three drive-pin engaging slots 8 arranged symmetrically thereabout. The spindle hole 7 and drive-pin engaging slots 8 are formed from three spaced strut members 9 depending inwardly from the inner surface of the cylindrical rim 5 of the hub 3.

The hub rim 5 includes a transverse slot 10 opening into a tape-receiving recess 11 within the rim 5. The recess 11 is formed by portions 12 of the rim 5 and by the inwardly extending strut members 9 forming the spindle hole 7 and drive-pin slots 8. The portions 12 of the rim 5 forming the edges of the transverse slot 10 include projections 13 extending inwardly into the tape-receiving recess 11.

Figures 2, 3:
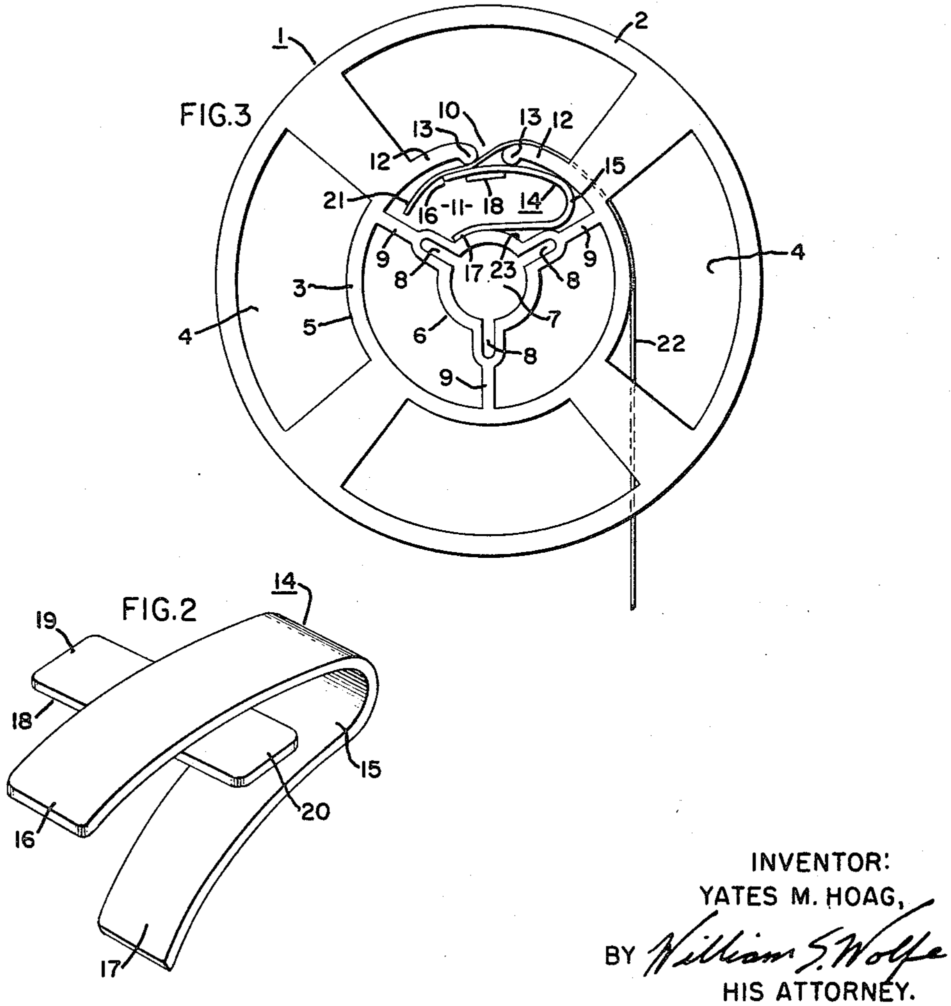
FIGURE 2 is a perspective view of the spring device of the present invention.
FIGURE 3 is a front elevation view of the spring device positioned in the tape-receiving recess of the reel hub to releasably secure an end portion of a tape roll.

The spring device 14 of the present invention is shown in FIGURE 2. The spring device comprises a U-shaped member 15 of a suitable resilient metal or plastic and include a pair of spaced finger members 16 and 17. One finger member 16 of the spring device 14 includes an elongated tab member 18 which is oriented so that a pair of tab surfaces 19 and 20 extend beyond the width of the spring finger 16 for manipulation by an operator.

FIGURE 3 shows the spring device 14 positioned in the tape-receiving recess 11 of the hub 3 of the tape reel 1 to releasably secure an end portion 21 of a magnetic recording tape roll 22 to be wound around the hub. In normal operation, the spring device 14 is first positioned in the tape-receiving recess 11 by pressing the finger members 16 and 17 toward each other so as to place them in compression. The spring device 14 is then inserted into the recess 11, the walls of which form a space which is small enough to keep the fingers in compression. The fingers thus exert an outward force against the bottom wall 23, of the recess and against the projections 13 of the rim portion 5 of the hub 3.

With the spring device 14 positioned in the tape-receiving recess 11 of the hub 3 the end portion 21 of the tape roll 22 is introduced into the transverse slot 10 in the hub rim 5. The operator then engages the finger tab portions 19 and 20 of the spring device 14 and presses the spring finger 16 downwardly to further compress the spring 14. The tape end 21 is then inserted past the projection 13 and into the recess 11 whereupon the tab 18 surfaces 19 and 20 are released. The spring finger 14 thus flexes outwardly until it is restrained by the projections 13 on the rim 5 with the tape end 21 positioned therebetween thereby clamping the tape end so that the tape roll 22 may be wound around the reel 1.

The tape roll 22 may be readily removed from the reel 1 by pressing down the finger tab surfaces 19 and 20 of the spring device 14 whereupon the tape end 21 is easily pulled from the tape-receiving recess 11 through the transverse slot 10 in the rim 5. The spring device 14 may then be allowed to remain in the tape-receiving recess 11 until the reel 1 is again used, or the spring device 14 may be removed for use in another reel if desired.

It is obvious that the tape-retaining device of the present invention may be used for applications other than retaining magnetic recording tape, such as retaining movie film or other tape rolls in other winding devices.

I have thus described a tape-retaining device for a reel wherein a spring device is positioned under compression in a tape-receiving recess in the hub of a suitable tape reel. A transverse slot in the hub rim opens into the recess so that a tape end may be inserted into the recess and trapped against a wall portion of the recess by the flexed fingers of the spring device which exert an outward force thereon.

Although the invention has been described with specificity, it is the aim of the appended claims to cover all such modifications as fall within the true spirit and scope of this invention.

What I claim and desire to secure by Letters Patent of the United States is:

1. A reel adapted to have tape wound thereon and including a central hub and spaced discs extending outwardly from said hub, said hub being bounded by a cylindrical rim and including a tape-receiving recess below said cylindrical rim, said cylindrical rim including a transverse slot opening into said tape-receiving recess, a spring device supported by said hub in said tape-receiving recess and including a pair of spring fingers under compression in said recess, means for further compressing said spring fingers whereby a tape end may be inserted into said tape-receiving recess through said transverse slot, whereupon the release of said compressing means allows said fingers to flex outwardly and to trap said tape end against said cylindrical rim.

2. The device as recited in claim 1 wherein the cylindrical rim includes at least one projection extending inwardly into the tape-receiving recess of said hub, said fingers of said spring device flexing outwardly to clamp said tape end against said projection.

3. The device as recited in claim 1 wherein the spring device comprises a U-shaped member including a pair of resilient spring fingers and wherein said compressing means comprises a tab member attached to one of said spring fingers to provide a pair of manually engageable tab surfaces, said spring device, when positioned in the tape-receiving recess of said hub, being further compressed by pressure applied to the tab surfaces of said tab member, whereupon the tape end may be introduced into said hub upon release of said tab surfaces.

References Cited

UNITED STATES PATENTS

| | | | |
|---|---|---|---|
| 2,476,636 | 7/1949 | Spisak | 242—74.2 X |
| 3,312,413 | 4/1967 | Bernstein | 242—74.2 |

FRANK J. COHEN, *Primary Examiner.*

N. L. MINTZ, *Assistant Examiner.*